Figure 1:
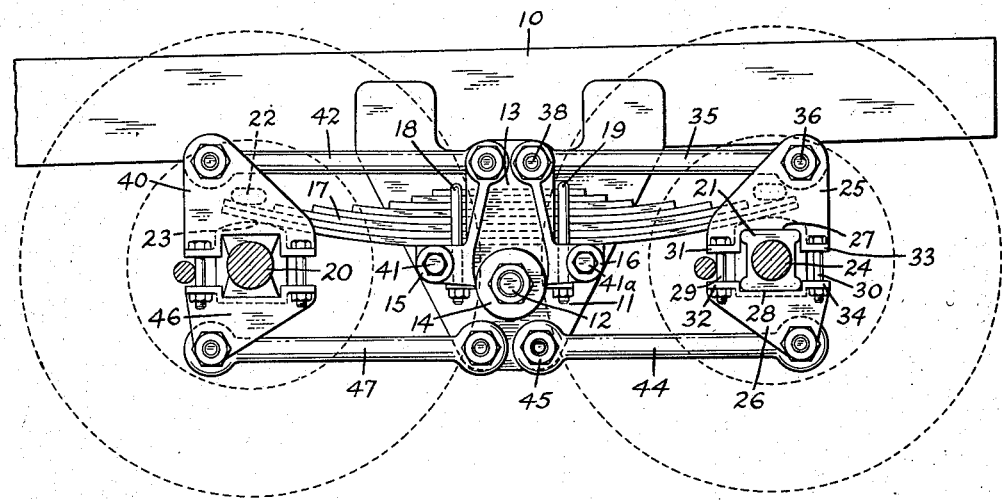

March 31, 1953  G. KELLER  2,633,204

SPRING SUSPENSION FOR DUAL AXLES FOR TRUCKS

Filed Oct. 22, 1949

INVENTOR.
GEORGE KELLER
BY
HIS ATTORNEYS.

Patented Mar. 31, 1953

2,633,204

UNITED STATES PATENT OFFICE 2,633,204

SPRING SUSPENSION FOR DUAL AXLES FOR TRUCKS

George Keller, West Caldwell, N. J., assignor to The Trucktor Corporation, Newark, N. J., a corporation of Delaware Application October 22, 1949, Serial No. 122,893

5 Claims. (Cl. 180—22)

This invention relates to spring suspensions for dual rear axle vehicles and it relates particularly to an improved form of spring suspension for vehicles such as buses, trucks and the like having dual rear axles, either or both of which may be drive axles.

Some manufacturers have regarded the "parallelogram" radius rod spring suspension as being the best arrangement available. In the parallelogram system, each axle is connected at each end to the frame by means of a pair of radius rods pivotally connected to extensions above and below the axle housing and to the vehicle frame so that the radius rods are essentially parallel and hence provide the "parallelogram" form described above. The frame is supported on the axles at each side by means of a curved leaf spring having its opposite ends supported on the axle and having its mid-portion pivotally supported on a trunnion shaft extending transversely of the vehicle frame. This arrangement of springs and radius rods confines the movement of the axles to an up and down path of a radius of curvature depending upon the length of the radius rods and prevents oscillation of the axles about their axes. The parallelogram arrangement provides a very good control of the axle shaft flange angle with respect to the engine shaft flange angle and also acts to balance the drive torque and braking forces within the structure.

While, as pointed out above, this type of spring suspension has many advantages, it likewise has some disadvantages. Among the disadvantages is the fact that the universal joint which connects the drive shaft to the rear axle moves up and down the same distance as the axle itself. This extended movement of the rear axle drive shaft and joint makes it difficult to provide the necessary transverse frame reinforcement which is required at the trunnion side brackets where torque moments are of very high value. In order to overcome this effect, it is common to use a very high type carrier in the rear axle so that it will position the drive shaft above a heavy tube cross member in the frame at the trunnion. This arrangement permits proper reinforcement of the frame but it does introduce some trouble in properly lubricating the top gears of the carrier. Moreover, the extreme movement of the drive shaft joint creates high angles between the shaft and the rear universal joint and causes trouble at this joint.

The trend in recent years has also been away from torque tube drives of which the parallelogram system described above is the equivalent, because of high shock loads on the gears. The Hotchkiss drive or an equivalent system has to a great extent replaced it.

The spring suspension embodying the present invention is constructed and arranged to overcome the disadvantages of the parallelogram system and also to afford an action in the spring suspension much like the Hotchkiss drive which produces, in addition to lower shock loads on the gear system, much better traction.

The new system, like the parallelogram system, includes a trunnion mounted spring having its opposite ends supported by the dual axles. It also includes radius rods which are connected at their inner ends to the frame and at their outer ends to the axle housings below the axles or to downward extensions from the axle housing.

In one form of the invention, the spring is used only as a load supporting element while additional upper radius rods are provided that are connected to the trunnion mounted saddle or carrier on which the spring is mounted. In this arrangement the upper set of radius rods moves with the spring and thereby allows some oscillatory movement of the axles about their axes.

The above-described type of spring suspension has the advantage that it absorbs sudden torque loads. Such movement pulls or pushes on the upper radius rod connected to the drive axle which causes the spring to flex and oscillate on the trunnion mount and thus absorbs shock in the spring connections at the axle. The same is true for brake reactions but in this case they do not balance each other out as in the parallelogram system. This unbalanced action is of substantial advantage especially when the drive axle is the rear axle. In the case of forward starts, the load is transferred to the rear or drive axle at the moment of starting, thereby increasing traction. Likewise, when the brakes are applied, the load is transferred from the drive or rear axle to the forward axle which, in turn, compensates for the extra weight of the drive axle as compared with the non-driving axle and brings the weights more nearly into balance for equalized braking effect. With the new suspension, constant drive flange angles are maintained as long as the vehicle operates on level roads regardless of the load in the vehicle. However, when bumps are encountered, the axles walk over the bumps causing the spring to flex and oscillate around the trunnion, thereby momentarily throwing the flange angle out of the theoretical angle just like the Hotchkiss drive does. However, for full axle travel over rough roads, the flange in the front of the carrier moves several inches less, due to oscillation of the suspension around the trunnion, than does the parallelogram system, and, as a result, conventional, low carrier rear axles may be used. This oscillation also reduces the angle between the shaft and the rear joint almost by half because of the shortened travel of the axles.

Figure 2:
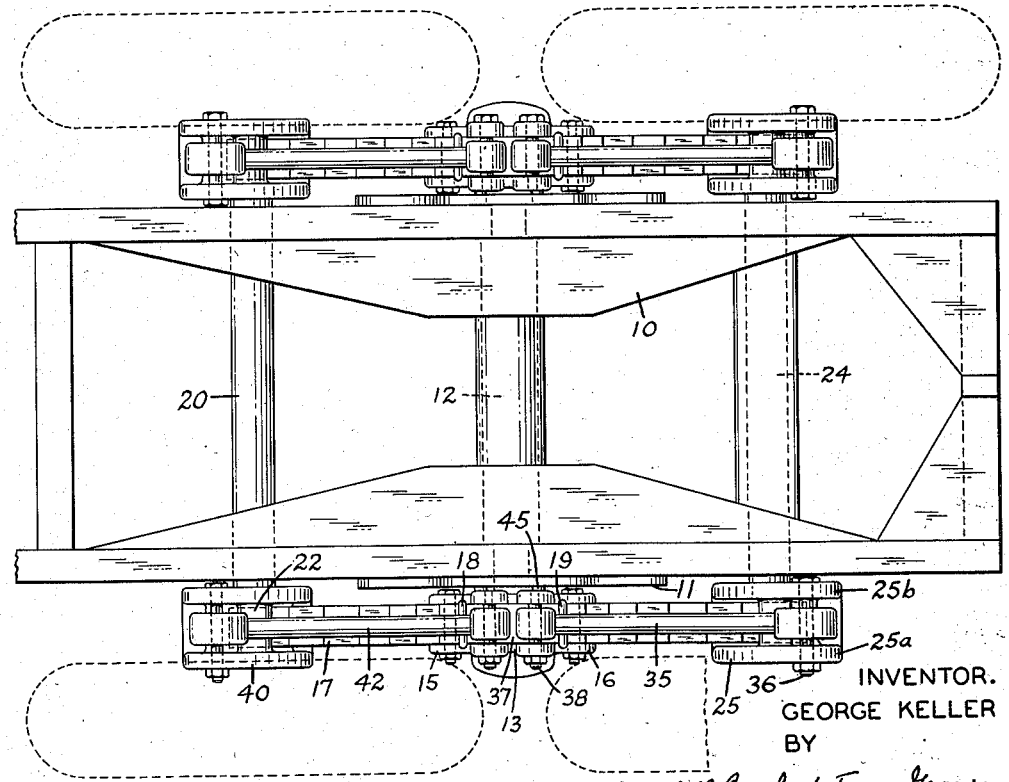

For a better understanding of the present invention, reference may be had to the accompanying drawings, in which:

Fig. 1 is a view in side elevation of a typical suspension embodying the present invention with details of the drive structure omitted, and Fig. 2 is a plan view of the axle suspension.

Referring now to Figs. 1 and 2, one type of my improved suspension is shown as applied to a dual rear axle vehicle, a portion of the frame 10 of the vehicle being shown. In this suspension, either the front or the rear axle or both may be driven by means of suitable drive shafts, universal joints and differential systems as required, this structure not forming a part of the present invention.

Fig. 1 discloses only one side of the spring suspension system, it being understood, and as indicated in Fig. 2, that the spring suspension on the opposite side of the frame 10 is a mirror image of that to be described. As shown in Figs. 1 and 2, the frame may be provided with a trunnion bracket 11 which is welded or otherwise secured to the side of the frame and extends below it to support a heavy trunnion shaft 12 which extends across the frame and thereby forms a reinforcing member for stiffening the frame and resisting torque loads thereon. The trunnion 12 supports a spring saddle or carrier 13 which includes a journal portion 14 for receiving the trunnion 12 and has a pair of outwardly extending arms 15 and 16 for supporting the spring beam 17, herein shown as a multi-leaf spring. The spring 17 is shackled to the saddle 13 by means of U bolts 18 and 19 to fix it in position for pivotal movement in a substantially vertical plane. The opposite ends of the spring beam 17 rest upon the axle housings 20 and 21 and may be supported thereon in any known way, for example, between the spring retainer 22 and the bevelled upper surface 23 of the axle housing.

Each of the axle housings is provided with an upper and a lower extension for connection with radius rods for maintaining the spacing of the wheels. The housing 21, for the rear axle 24, for example, is provided with an upper generally triangular extension 25 and a lower generally triangular extension 26, which have notches 27 and 28 in their opposing faces straddling the axle 24. The extensions are clamped to the axle by means of bolts 29 and 30 extending through the base flanges 31 and 32 and the base flanges 33 and 34 on opposite sides of the notches 27 and 28.

The upper end of the extension 25 is slotted or generally channel-shaped, as indicated in Fig. 2. The opposite flanges 25a and 25b of the channel are adapted to receive between them the outer end of a radius rod 35. The spring retainers 22 may be located between the flanges 25a and 25b of the extensions. The radius rod is connected to the flanges 25a and 25b by means of a cross bolt 36. A rubber bushing or a spherical joint (not shown) is interposed between the radius rod and the bolt to permit tilting of the axle transversely of the frame 10. The resilient or spherical joints at the ends of the radius rods are well known and are not illustrated herein. The inner end of the radius rod 35 is pivotally connected to the upper end of the spring saddle or hanger 13 which is provided with a groove 37 for reception of the inner end of the radius rod. The latter is retained in position by means of a bolt 38 also having a resilient or spherical bushing supporting the radius rod for limited rotation as well as pivotal movement. The bolt 38 extends through the flanges on the opposite sides of the groove 37 in the saddle 13. As shown, the saddle 13 consists of inner and outer confronting sections which are connected by means of the bolts 41 and 41a extending through the shoulders 15 and 16.

The upper extension 40 on the front axle 20 is similarly connected to the saddle 13 by means of the radius rod 42.

The lower extension 26 on the axle 24 is pivotally and rotatably connected to a radius rod 44 at one end and the opposite end of the radius rod 44 is connected to the trunnion bracket or hanger 11 for pivoting and rotary movement as described above by means of a pivot bolt 45. The lower extension 46 on the front axle 20 is connected by means of a radius rod 47 to the hanger 11 below the trunnion 12 in a similar manner.

The above-described spring suspension differs from the parallelogram system in that the inner ends of the upper radius rods 35 and 42 are not connected to the frame of the vehicle but instead are connected to the spring saddle and thus are movable with the spring as it tilts about the trunnion shaft 12. Therefore, when the front axle 20 rises as the vehicle passes over a bump the spring rocks around the trunnion and also flexes at both ends with the result that the saddle 13 tilts and the front axle also rolls or tilts about its axis. This is caused by movement of the radius rod 42 slightly to the rear due to the rocking movement of the saddle 13 without corresponding movement of the right-hand end of the radius rod 47. As a result of the movement of the spring and the axle, there is less actual relative movement between the axles and the frame 10 and the angle of the propeller shaft does not change as much as it would in the conventional type of suspension. Also, the flange angle of the joint, assuming that the front axle is driven, will tilt slightly, thereby reducing the deflection of this joint.

The action of the rear wheel is exactly the same so that if the rear axle is driven, the deflection of the drive shaft is reduced and a walking action occurs in either case which causes an effect similar to the Hotchkiss drive, permitting the wheels to move forward and back.

From the preceding description of a typical spring suspension embodying the present invention, it will be apparent that I have provided a system which overcomes many of the disadvantages of prior spring suspensions, permits the use of conventional differentials and gear carriers, thereby reducing problems of lubrication, decreases the movement of the drive shafts to permit more adequate reinforcement of the vehicle frame at the necessary points and also provides a better distribution of braking and driving torques and better traction than are afforded by the prior devices.

It will be understood that suspensions of the type described above are susceptible to considerable modification in the details of the drive shaft extensions, the connections of the drive shafts to the axles and in other features. Therefore, the forms of the invention described herein should be considered as illustrative and not as limiting the scope of the following claims.

I claim:

1. A spring suspension for supporting a vehicle frame on a pair of axles comprising for each side of said vehicle frame, a spring beam supported at opposite ends on one end of each of said axles and pivotally connected at its mid-portion to said frame for rocking movement in a substantially vertical plane, a rigid member fixed to each axle and extending above and below the same, a pair of radius rods, one rod having an outer end pivotally connected to the rigid member below one of said axles, the other radius rod having an outer end connected pivotally to the rigid member below the other axle, the inner ends of said radius rods being adjacent to each other and pivotally connected to said frame, and inextensible axle spacing means pivotally connected to said rigid members above said axles and to said spring beam for pivotal movement therewith.

2. A spring suspension for supporting a vehicle frame on a pair of rear axles, at least one of which is a drive axle, comprising for each side of said frame a pivot shaft mounted on said frame between said axles, a spring mounted above and supported at its mid-portion for pivotal movement on said shaft and having its opposite ends supported on and above said axles, radius rods pivotally connected to said frame below said shaft and extending in opposite directions therefrom, means extending below said axles and rigid therewith pivotally connected to the outer ends of said radius rods, and radius maintaining means mounted for pivotal movement around said shaft above the latter and pivotally connected to said axles above the latter.

3. A spring suspension for supporting a vehicle frame on a pair of rear axles, at least one of which is a drive axle, comprising for each side of said frame, a spring beam having its opposite ends supported by said axles, a spring supporting member fixed to said beam at about its mid-portion, a shaft projecting from said frame and pivotally engaging said spring supporting member, a pair of radius rods each having an inner end pivotally connected to said frame below said shaft and an outer end pivotally connected to one of said axles below the latter, and another pair of radius rods each having an inner end pivotally connected to said spring supporting member above said shaft and an outer end pivotally connected to one of said axles above the latter.

4. A spring suspension for supporting a vehicle frame on a pair of rear axles, at least one of which is a drive axle comprising a spring support pivotally mounted on one side of said frame for tilting movement about an axis transversely of said frame, a spring beam fixed to said spring support and having its opposite ends supported by said axles, a first pair of radius rods below said beam and said axles, said radius rods being pivotally connected at their outer ends to said axles and at their inner ends to said frame below said spring support, and a second pair of radius rods above said beam, said second pair of radius rods being pivotally connected to said axles and said spring support in substantial parallel relation to said first pair of radius rods.

5. A spring suspension for supporting a vehicle frame on dual rear axles, at least one of which is a drive axle, comprising for each end of said axles, a bowed spring beam supported at opposite ends on said axles, a spring support fixed to about the middle of said spring, pivot means on said frame connecting said support to said frame for pivoting movement about an axis substantially transverse to said frame, rigid members fixed to the ends of said axles and extending above and below the latter, a pair of radius rods each pivotally connected at an outer end to one of said members below said axle and at its inner end to said frame below said pivot means and another pair of radius rods, each having an outer end pivotally connected to one of said members above its corresponding axle and an inner end pivotally connected to said spring support.

GEORGE KELLER.

REFERENCES CITED

The following references are of record in the file of this patent:

UNITED STATES PATENTS

| Number | Name | Date |
|---|---|---|
| 1,913,698 | Clement | June 13, 1933 |
| 1,946,060 | Buckendale | Feb. 6, 1934 |
| 2,096,530 | Alden | Oct. 19, 1937 |
| 2,361,166 | Ayers | Oct. 24, 1944 |